INVENTOR
FRIEDRICH MEYER
BY Edward T Connors
ATTORNEY

Patented June 23, 1953

2,642,716

UNITED STATES PATENT OFFICE 2,642,716

TIMEPIECE MOVEMENT COMPRISING A DIFFERENTIAL GEAR

Friedrich Meyer, Grenchen, Switzerland, assignor to Felsa A. G., Grenchen, Switzerland Application May 15, 1951, Serial No. 226,362
In Switzerland March 14, 1951

2 Claims. (Cl. 58—85)

My invention relates to timepiece movements comprising a differential gear in driving connection with the barrel and the barrel arbor for driving a member by the barrel in the one direction of rotation and by the barrel arbor in the other direction, said differential gear having two drive wheels, the one of these drive wheels being in drive connection with the barrel and the other with the barrel arbor.

There are prior differential gears of the above kind. However, they comprise only one planet wheel, while the reversion of the direction of rotation of the two drive wheels is effected by an intermediate wheel lying outside the differential gear. For mounting this intermediate wheel either an additional cock had been required or the pillar plate had to be weakened in an undue manner for enabling the intermediate wheel to be mounted.

It is an object of my invention to avoid the use of such an intermediate wheel.

I attain this aim by the feature of one of the drive wheels carrying two intermeshing planet wheels, the one of said planet wheels being in drive connection with the other drive wheel, and the other planet wheel with said driven member. Since a second planet wheel mounted on the one drive wheel is substituted for the above-mentioned intermediate wheel, an additional cock or weakening the pillar plate can be dispensed with. The reversion of the direction of rotation of the driven member is now effected within the differential gear.

The member driven by the differential gear may serve the purpose of operating a locking device, such as a snap device, for instance, for locking and releasing the oscillating weight of an automatic winding mechanism for the mainspring, and/or of operating a means for indicating the development condition of the mainspring.

Figure 1:
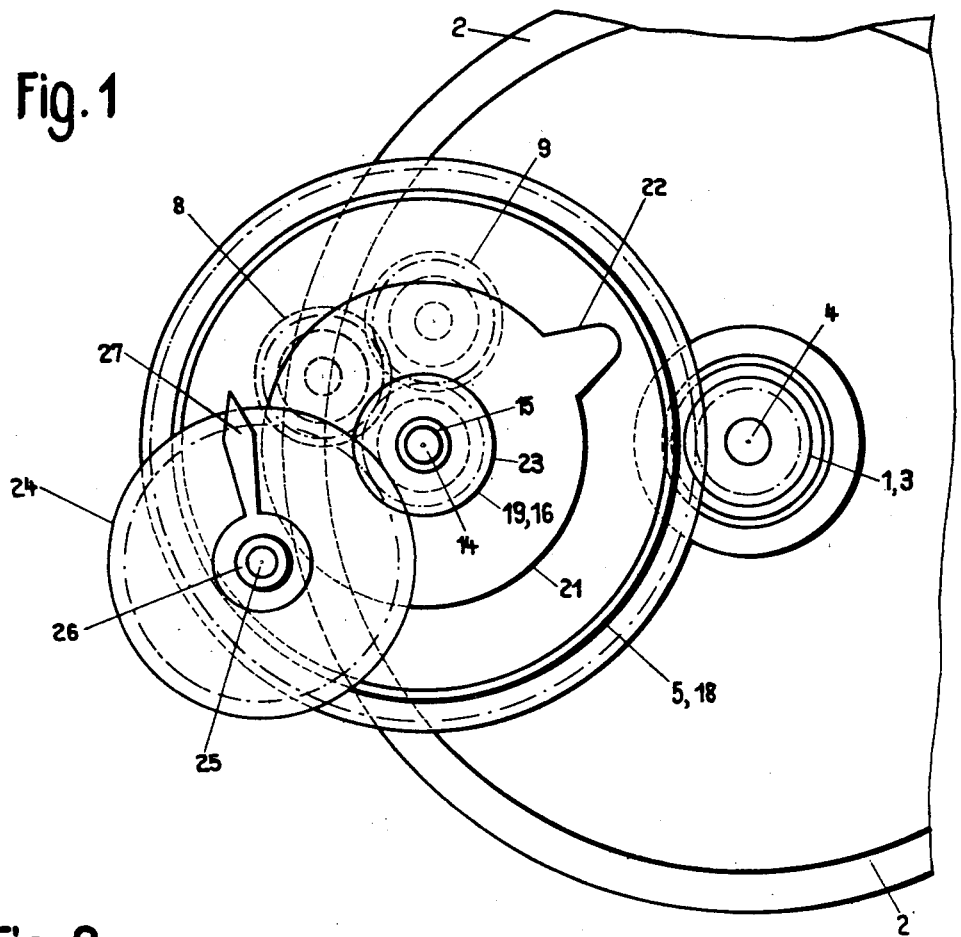
Figure 2:
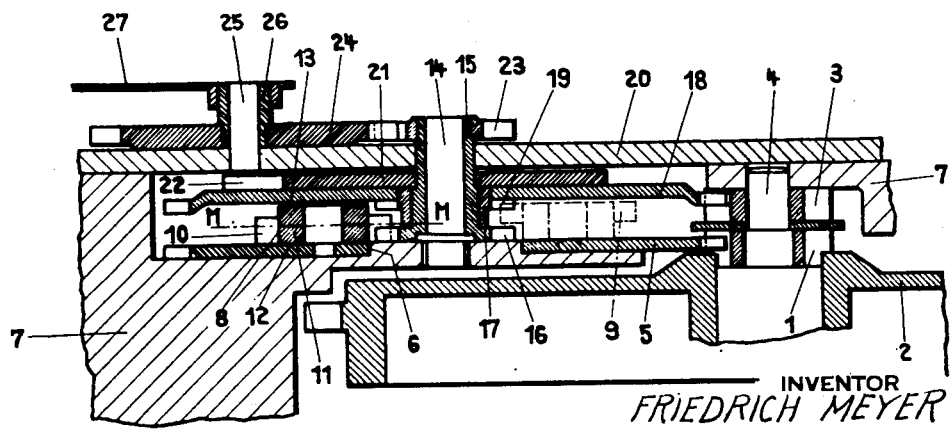

Other objects and features will be apparent as the following description proceeds, reference being had to the accompanying drawings illustrating by way of example one embodiment of my invention, and wherein Fig. 1 is a plan view of that portion of a timepiece movement, which concerns my invention, seen from the side of the hand indicating the development condition of the mainspring, pillar plate and cock being removed;

Fig. 2 is a cross section, turned into one plane, through the axis of the barrel arbor, the axis of the drive wheels of the differential gear, and the axis of the hand indicating the development condition of the mainspring.

A pinion 1 is fastened to the barrel 2, while a pinion 3 is fixed to the barrel arbor 4 rotatable with regard to the barrel 2. Pinion 1 is equal to pinion 3, i. e., both pinions have the same diameter and the same number of teeth. The drive wheel 5 is permanently in mesh with the pinion 1 and is pivoted on a shoulder 6 of the pillar plate 7. Two planet wheels 8 and 9 are pivoted on the drive wheel 5 and are in mesh with each other (Fig. 1). They are equal i. e., have the same diameter and the same number of teeth. In both planet wheels 8 and 9 the toothed rim 10 lies in the same manner unsymmetrically with regard to the middle plane M, M of the hub 11. The end face 12 of the hub 11 of wheel 8, lying nearer the toothed rim 10, is turned towards the wheel 5, while in wheel 9 the end face 13 of the hub 11, turned away from the toothed rim 10, lies opposite the wheel 5. A pin 14 is fixed to the pillar plate 7, coaxially to the shoulder 6, this pin projecting beyond the cock 20 fixed to the pillar plate 7. A sleeve 15 carrying a sun wheel 16 is revolvably mounted on the pin 14. This sleeve 15 constitutes the member driven by the differential gear. The sun wheel 16 is permanently in mesh with the planet wheel 8. A bush 17 is loosely mounted on the sleeve 15, the second drive wheel 18 and the sun wheel 19 being rigidly fixed to bush 17. The coaxial sun wheels 16 and 19 have the same diameter and the same number of teeth. The same is true for the two drive wheels 5 and 18. The planet wheel 9 permanently engages the sun wheel 19. A disk 21 comprising a cam 22 is rigidly connected with the sleeve 15. This cam 22 serves the control of a locking device, such as a snap mechanism, for instance, for stopping and releasing the oscillating weight of an automatic winding mechanism of the timepiece movement. The winding mechanism and the snap device are not shown. The latter forms an object of my copending patent application Serial No. 226,361 filed May 15, 1951.

Also the sleeve 15 projects beyond the cock 20 and carries on its free end a pinion 23 engaging a spur wheel 24 mounted on the cock 20 by means of a pin 25. A sleeve 26, which is in rigid connection with the spur wheel 24, carries a hand 27 for indicating the development condition of the mainspring (not shown) located in the barrel 2. The differential gear 5, 16, 8, 9, 18, 19, therefore, does not only drive the control cam 22 but also a device for indicating the development condition of the mainspring. However, in another embodiment, the differential gear may either only drive the control cam 22 or the indicating device. The hand 27 may be replaced by another indicating means, such as a cipher disk or drum or the like, for instance.

The described and shown mechanism works as follows:

When, on a development of the mainspring, the barrel 2 rotates, the pinion 1 also turns. The barrel arbor 4 with its pinion 3 is at rest or on a simultaneous winding action mostly rotates at another speed than the pinion 1. Therefore, the wheel 5 turns relatively to the drive wheel 18 and to the sun wheel 19. The pinion 1 drives the wheel 5 while the planet wheel 8 revolves about the sun wheel 16 and the planet wheel 9 about the sun wheel 19. Since the wheel 5 rotates relatively to the wheel 18, a reaction occurs between the sun wheel 19 and the planet wheel 9, due to which the planet wheel 9, through the intermediary of the planet wheel 8, drives the sun wheel 16 and the sleeve 15 in the one direction. Therefore, disk 21 with cam 22 and hand 27 turn in the one of their directions of rotation.

When the mainspring is wound up by rotation of the barrel arbor 4, wheel 18 turns at another speed than wheel 5. Since, on a winding action, the barrel arbor 4 rotates in the same direction as the barrel on a development of the mainspring, it is true that also the drive wheel 18 turns in the direction as the drive wheel 5 on a development of the mainspring. However, since wheel 18 rotates in the same direction relatively to the wheel 5 as wheel 5 to wheel 18 on a development of the mainspring, a reaction in the opposite direction occurs between sun wheel 19 and planet wheel 9 so that sun wheel 19 drives planet wheel 9 and the latter, through the intermediary of planet wheel 8, sun wheel 16 and sleeve 15 in the other direction of rotation. Therefore, cam 22 and hand 27 revolve in the opposite direction than on a development of the mainspring. It is understood that reversing the direction of rotation of the driven member 15 is obtained by the differential gear itself and not by a wheel lying outside this gear. On a simultaneous development and winding action the effects are superimposed in the differential gear. When, particularly in an automatic winding mechanism, the speeds of the pinions 1 and 3 are equal at a certain moment, the differential gear has no influence whatever on the sleeve 15 and the latter is at rest.

Instead of mounting the plant wheels 8 and 9 on the drive wheel 5, they may be arranged on the drive wheel 18. In this case, the sun wheel 19 must be rigidly connected with the drive wheel 5 and the sun wheel 16 of the sleeve 15 lies above the sun wheel 19 in Fig. 2. Instead of using the intermediate gear 23, 24, the hand 27 or another indicating means may be rigidly coupled with the sleeve 15.

While I have shown and described one embodiment, I do not wish to unnecessarily limit the scope of my invention thereto but reserve the right to make such modifications and rearrangements of the several parts as may come within the purview of the accompanying claims.

What I claim is:

1. A timepiece movement comprising a barrel for a spring, an arbor for the barrel, a first pinion gear rigidly attached to the barrel and freely mounted on the barrel arbor, a second pinion gear rigidly attached to the barrel arbor outwardly of the first pinion, a driven hub member responsive to the degree of winding of the spring, a differential gear in driving connection with the first and second pinions for driving the hub member in one direction by rotation of the barrel and in the reversed direction by rotation of the arbor, the differential gear including a first drive wheel freely mounted and centered about the hub member and driven by the first pinion, a second drive wheel freely mounted about the hub member and driven by the second pinion, and two intermeshing planet wheels each having a hub and carried by one of the drive wheels, a first sun wheel rigidly carried by the hub member in engagement with one of the planet wheels, a second sun wheel freely mounted on the hub member and rigidly carried by the other drive wheel in engagement with the other planet wheel, the planet wheels of equal diameter and each having a toothed rim lying unsymmetrically with respect to a plane extending through the middle of the hubs of the planet wheel, the end face of the hub of one planet wheel having the toothed rim closest thereto turned towards the drive wheel carrying the planet wheels so that clearance is had between the toothless portion of the rims of the planet wheels and the opposite sun wheel.

2. A timepiece movement comprising a barrel for a spring, an arbor for the barrel, a driven member responsive to the degree of winding of the spring, a differential gear in driving connection with the barrel and the barrel arbor for driving the member in one direction by rotation of the barrel and for driving the member in reversed direction by rotation of the arbor, the differential gear including a first drive wheel driven by the barrel, a second drive wheel driven by the arbor, two intermeshing planet wheels carried by one of said drive wheels, one of the planet wheels in direct drive connection with one drive wheel, the other of said planet wheels in direct drive connection with the driven member, a sun wheel rigidly connected with the driven member, and a second sun wheel rigidly connected with one of the drive wheels, the sun wheels coaxial with each other, the planet wheels of equal diameters and hubs and each having a toothed rim lying unsymmetrically with respect to a plane extending through the middle of the hubs, the end face of the hub of one planet wheel having the toothed rim closest thereto turned towards the drive wheel carrying the planet wheels.

FRIEDRICH MEYER.

References Cited in the file of this patent

UNITED STATES PATENTS

| Number | Name | Date |
|---|---|---|
| 790,513 | Mazer | May 23, 1905 |
| 1,191,525 | Mazer | July 18, 1916 |

FOREIGN PATENTS

| Number | Country | Date |
|---|---|---|
| 2,284 | Switzerland | Mar. 25, 1890 |
| 425,795 | France | Apr. 13, 1911 |